(12) United States Patent
Choji et al.

(10) Patent No.: US 11,760,307 B2
(45) Date of Patent: Sep. 19, 2023

(54) AUTHENTICATION DEVICE, VEHICLE, AUTHENTICATION METHOD, AND STORAGE MEDIUM STORING AN AUTHENTICATION PROGRAM

(71) Applicant: TOYOTA JIDOSHA KABUSHIKI KAISHA, Toyota (JP)

(72) Inventors: Hiroaki Choji, Toyota (JP); Shigeki Nishiyama, Toyota (JP); Naoyuki Takada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/649,822

(22) Filed: Feb. 3, 2022

(65) Prior Publication Data
US 2022/0289140 A1    Sep. 15, 2022

(30) Foreign Application Priority Data
Mar. 9, 2021    (JP) .................................. 2021-037732

(51) Int. Cl.
*B60R 25/24* (2013.01)
*B60R 25/20* (2013.01)
(Continued)

(52) U.S. Cl.
CPC .............. *B60R 25/24* (2013.01); *B60R 25/01* (2013.01); *B60R 25/2072* (2013.01); *G01S 13/0209* (2013.01); *G01S 13/08* (2013.01); *G01S 13/68* (2013.01); *G07C 9/00309* (2013.01); *H04W 12/06* (2013.01); *B60R 2325/108* (2013.01);
(Continued)

(58) Field of Classification Search
CPC ......... B60R 25/24; G01S 13/68; G01S 13/08; H04W 12/06; G07C 9/00119; H04L 63/107
See application file for complete search history.

(56) References Cited

U.S. PATENT DOCUMENTS

| 2015/0291127 A1* | 10/2015 | Ghabra | ................... G01P 15/00 701/2 |
| 2019/0023225 A1* | 1/2019 | Heinbockel | .......... H01Q 1/3241 |
| 2019/0256047 A1 | 8/2019 | Iwashita et al. | |

FOREIGN PATENT DOCUMENTS

JP         2018-71190 A      5/2018

* cited by examiner

*Primary Examiner* — Vernal U Brown
(74) *Attorney, Agent, or Firm* — Oblon, McClelland, Maier & Neustadt, L.L.P.

(57) ABSTRACT

An authentication device including: a processor; a first communication section installed at a vehicle and configured to perform first wireless communication with a terminal; and a plurality of second communication sections installed at the vehicle and configured to perform second wireless communication with the terminal, the processor being configured to: compute a distance and an angle of a position of the terminal with respect to the first communication section based on the first wireless communication of the first communication section with the terminal; cause a second communication section that, out of the plurality of second communication sections, corresponds to the computed angle, to execute the second wireless communication with the terminal; and determine, based on the executed second wireless communication and the computed distance, whether or not the terminal is present in an area corresponding to the second communication section executing the second wireless communication.

8 Claims, 6 Drawing Sheets

(51) Int. Cl.
  *B60R 25/01*   (2013.01)
  *G07C 9/00*    (2020.01)
  *H04W 12/06*   (2021.01)
  *G01S 13/08*   (2006.01)
  *G01S 13/68*   (2006.01)
  *G01S 13/02*   (2006.01)

(52) U.S. Cl.
  CPC .................. *B60R 2325/20* (2013.01); *G07C 2009/00793* (2013.01); *G07C 2209/63* (2013.01)

AUTHENTICATION DEVICE, VEHICLE, AUTHENTICATION METHOD, AND STORAGE MEDIUM STORING AN AUTHENTICATION PROGRAM

CROSS-REFERENCE TO RELATED APPLICATION

This application is based on and claims priority under 35 USC 119 from Japanese Patent Application No. 2021-037732 filed on Mar. 9, 2021, the disclosure of which is incorporated by reference herein.

BACKGROUND

Technical Field

The present disclosure relates to an authentication device, a vehicle, an authentication method, and a storage medium storing an authentication program.

Related Art

Japanese Patent Application Laid-Open (JP-A) No. 2018-071190 discloses an electronic key system capable of thwarting what are referred to as relay attacks, in which unauthorized communication is established via a relay device.

In this electronic key system, from out of plural communication areas generated by low frequency (LF) antennae respectively installed to plural doors, an ultra-wideband (UWB) distance measurement determination threshold is set so as to include the position of an LF antenna corresponding to a communication area in which an electronic key is present.

The electronic key system disclosed in JP-A No. 2018-071190 requires actuation of all the LF communication sections in the plural communication areas, resulting in higher power consumption.

SUMMARY

An object of the present disclosure is to provide an authentication device, a vehicle, an authentication method, and an authentication program that suppress relay attacks whilst also suppressing power consumption during communication with an electronic key.

A first aspect is an authentication device including a first communication section installed at a vehicle and configured to perform first wireless communication with a terminal, plural second communication sections installed at the vehicle and configured to perform second wireless communication with the terminal, a computation section configured to compute a distance and an angle of a position of the terminal with respect to the first communication section based on the first wireless communication of the first communication section with the terminal, an execution section configured to cause a second communication section that, out of the plural second communication sections, corresponds to the angle computed by the computation section to execute the second wireless communication with the terminal, and a determination section configured to determine based on the executed second wireless communication and the computed distance whether or not the terminal is present in an area corresponding to the second communication section executing the second wireless communication.

The authentication device of the first aspect includes the first communication section and the second communication section that perform communication with the terminal. The first communication section performs the first wireless communication with the terminal. Plural of the second communication sections are provided, and the second communication sections perform the second wireless communication with the terminal. In this authentication device, the computation section computes the distance and the angle of the position of the terminal with respect to the first communication section based on the first wireless communication with the terminal. The execution section causes the second communication section that corresponds to the angle computed by the computation section to execute the second wireless communication with the terminal. The determination section determines, based on the executed second wireless communication and the computed distance, whether or not the terminal is present in the area corresponding to the second communication section executing the second wireless communication. According to this authentication device, one second communication section out of the plural second communication sections is caused to execute wireless communication based on the angle of the terminal, thereby enabling power consumption during communication with the terminal to be suppressed. Moreover, unlocking is enabled only in cases in which the terminal is present in an area corresponding to a second communication section, thereby suppressing relay attacks that make use of a relay device.

An authentication device of a second aspect is the authentication device of the first aspect, wherein the determination section is further configured to set a determination distance as a threshold based on the angle computed by the computation section, and determine that the terminal is present in the area in a case in which communication with the terminal is established by the second wireless communication and the distance computed by the computation section is no greater than the determination distance.

In the authentication device of the second aspect, the determination distance that the determination section employs to make determination is dynamically changed based on the computed angle of the terminal, thereby enabling security against relay attacks to be ensured.

An authentication device of a third aspect is the authentication device of the first aspect or the second aspect, wherein the second communication sections are provided at respective locations corresponding to a driving seat door, a front passenger seat door, and a back door of the vehicle, and the execution section is configured to cause a second communication section located at the angle computed by the computation section to execute the second wireless communication.

According to the authentication device of the third aspect, measures against relay attacks are realized individually for each door of the vehicle.

An authentication device of a fourth aspect is the authentication device of the third aspect, wherein in a case in which the angle computed by the computation section does not correspond to either the driving seat door or the front passenger seat door, the execution section causes a second communication section corresponding to the back door to execute the second wireless communication.

According to the authentication device of the fourth aspect enables processing relating to determination for the back door to be simplified.

A fifth aspect is a vehicle including the authentication device of any one of the first aspect to the fourth aspect, and a driving seat door, a front passenger seat door, and a back door configured to be locked and unlocked by the authentication device.

According to the vehicle of the fifth aspect enables relay attacks to be suppressed while also suppressing power consumption during communication with the electronic key.

A vehicle of a sixth aspect is the vehicle of the fifth aspect, wherein the first communication section is installed at the vehicle at a location where radio waves have a clear line of sight.

According to the vehicle of the sixth aspect, the first communication section does not necessary need to be installed at the center of the vehicle, thereby enabling a greater degree of freedom to be secured with respect to the installation location of the first communication section.

A seventh aspect is an authentication method of an authentication device including a first communication section that is installed at a vehicle and that performs first wireless communication with a terminal, and a second communication section that performs second wireless communication with the terminal. In this authentication method, a computer executes processing including computing a distance and an angle of a position of the terminal with respect to the first communication section based on the first wireless communication of the first communication section with the terminal, executing the second wireless communication with the terminal using the second communication section that, out of plural of the second communication sections, corresponds to the computed angle, and determining based on the executed second wireless communication and the computed distance whether or not the terminal is present in an area corresponding to the second communication section executing the second wireless communication.

The authentication method of the seventh aspect is a method for application to an authentication device provided with the first communication section and the second communication section that communicate with the terminal. The first communication section and the second communication section are configured as described previously. In this authentication method, a computer computes the distance and the angle of the position of the terminal with respect to the first communication section based on the first wireless communication with the terminal, and executes the second wireless communication with the terminal using the second communication section that corresponds to the computed angle. The computer then determines, based on the executed second wireless communication and the computed distance, whether or not the terminal is present in the area corresponding to the second communication section executing the second wireless communication. According to this authentication method, one second communication section out of the plural second communication sections is caused to execute wireless communication based on the angle of the terminal, thereby enabling power consumption during communication with the terminal to be suppressed. Moreover, unlocking is enabled only in cases in which the terminal is present in an area corresponding to a second communication section, thereby suppressing relay attacks that make use of a relay device.

An eighth aspect is a non-transitory storage medium storing an authentication program. The authentication program is an authentication program for executing processing of an authentication device including a first communication section that is installed at a vehicle and that performs first wireless communication with a terminal, and a second communication section that performs second wireless communication with the terminal, the authentication program causing a computer to execute processing including computing a distance and an angle of a position of the terminal with respect to the first communication section based on the first wireless communication of the first communication section with the terminal, executing the second wireless communication with the terminal using the second communication section that, out of plural of the second communication sections, corresponds to the computed angle, and determining based on the executed second wireless communication and the computed distance whether or not the terminal is present in an area corresponding to the second communication section executing the second wireless communication.

The authentication program of the eighth aspect causes a computer to execute the following processing of an authentication device provided with the first communication section and the second communication section that communicate with the terminal. The first communication section and the second communication section are configured as described previously. In this authentication program, a computer computes the distance and the angle of the position of the terminal with respect to the first communication section based on the first wireless communication with the terminal, and executes the second wireless communication with the terminal using the second communication section that corresponds to the computed angle. The computer then determines, based on the executed second wireless communication and the computed distance, whether or not the terminal is present in the area corresponding to the second communication section executing the second wireless communication. According to this authentication program, one second communication section out of the plural second communication sections is caused to execute wireless communication based on the angle of the terminal, thereby enabling power consumption during communication with the terminal to be suppressed. Moreover, unlocking is enabled only in cases in which the terminal is present in an area corresponding to a second communication section, thereby suppressing relay attacks that make use of a relay device.

The present disclosure is capable of suppressing relay attacks whilst also suppressing power consumption during communication with an electronic key.

BRIEF DESCRIPTION OF THE DRAWINGS

An exemplary embodiment of the present disclosure will be described in detail based on the following figures, wherein.

DETAILED DESCRIPTION

Detailed explanation follows regarding an example of an exemplary embodiment of the present disclosure, with reference to the drawings.

Configuration

Figure 1:
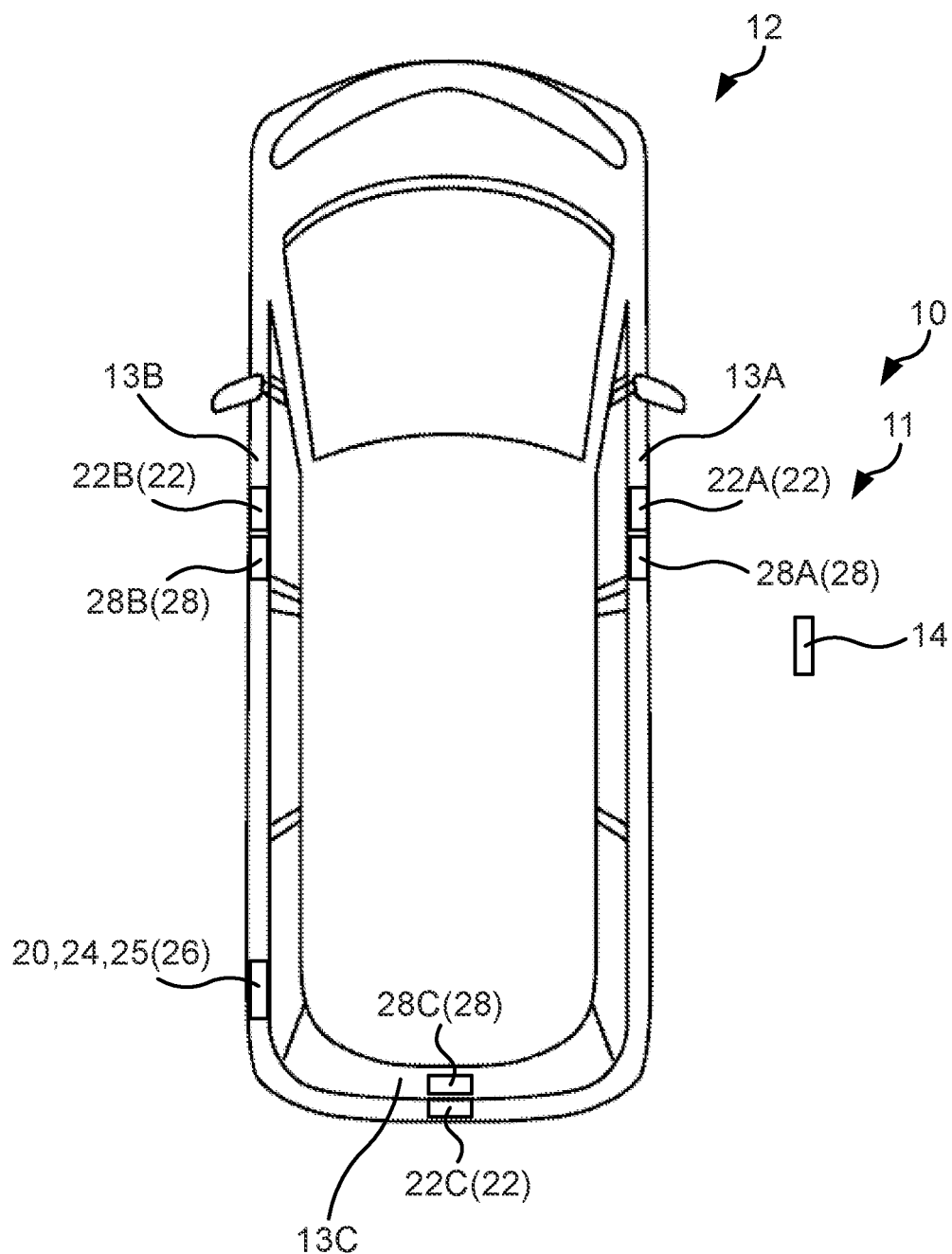
FIG. 1 is a configuration diagram schematically illustrating an electronic key system according to an exemplary embodiment.
Figure 2:
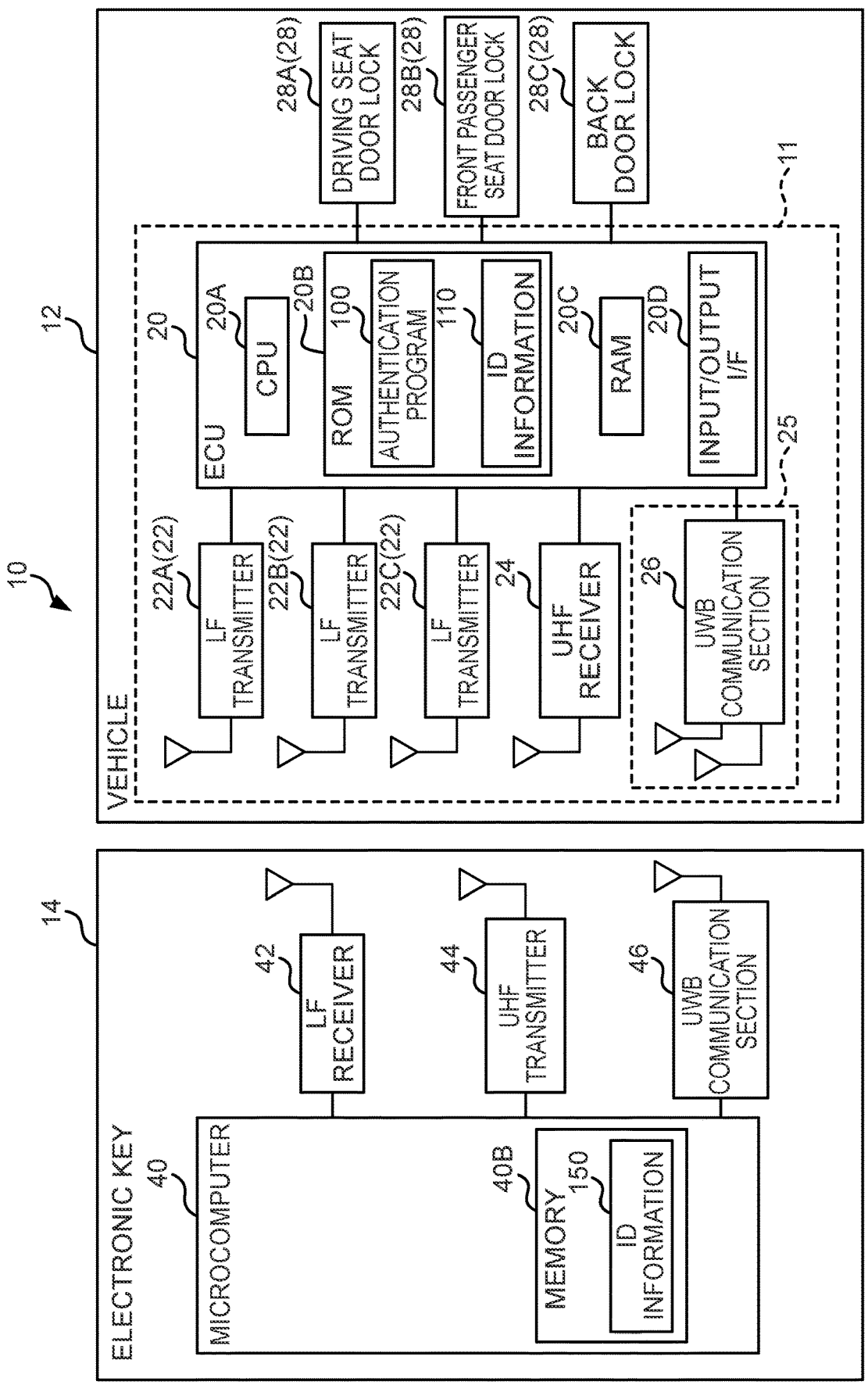
FIG. 2 is a block diagram illustrating configuration of an electronic key system according to an exemplary embodiment.

As illustrated in FIG. 1 and FIG. 2, an electronic key system 10 of the present exemplary embodiment is configured including onboard equipment 11, plural door locking devices 28, and an electronic key 14 serving as a terminal. The onboard equipment 11 and the door locking devices 28 are installed at a vehicle 12. The vehicle 12 includes a driving seat door 13A beside a driving seat, a front passenger seat door 13B beside a front passenger seat, and a back door 13C at the vehicle rear. The door locking devices 28 include a driving seat door lock 28A that locks and unlocks the driving seat door 13A, a front passenger seat door lock 28B that locks and unlocks the front passenger seat door 13B, and a back door lock 28C that locks and unlocks the back door 13C.

As illustrated in FIG. 2, the onboard equipment 11 installed at the vehicle 12 includes an electronic control unit (ECU) 20, plural low frequency (LF) transmitters 22, an ultra high frequency (UHF) receiver 24, and a distance measurement unit 25. The ECU 20, the UHF receiver 24, and the distance measurement unit 25 are provided at locations of the vehicle 12 where radio waves have a clear line of sight, such as a pillar at a rearmost section of the vehicle 12. Configuration of the ECU 20 will be described later.

The LF transmitters 22 are communication units that perform LF band wireless communication, and transmit request signals toward a LF receiver 42, described later. The LF transmitters 22 are examples of second communication sections. The LF transmitters 22 of the present exemplary embodiment include an LF transmitter 22A installed to the driving seat door 13A, an LF transmitter 22B installed to the front passenger seat door 13B, and an LF transmitter 22C installed to the back door 13C.

The UHF receiver 24 is a communication unit that performs UHF band wireless communication, and receives a response signal from a UHF transmitter 44, described later.

The distance measurement unit 25 is configured including a UWB communication section 26. The UWB communication section 26 is a communication unit that performs ultra-wideband (UWB) wireless communication, and communicates with a UWB communication section 46, described later. The UWB communication section 26 includes at least two antennae. The ECU 20, described later, is able to compute an arrival direction of radio waves based on radio wave phase information from the respective antennae. The UWB communication section 26 is an example of a first communication section.

The ECU 20 is configured including a central processing unit (CPU) 20A, read only memory (ROM) 20B, random access memory (RAM) 20C, and an input/output interface (I/F) 20D. The CPU 20A, the ROM 20B, the RAM 20C, and the input/output I/F 20D are connected so as to be capable of communicating with each other through a non-illustrated internal bus.

The CPU 20A is a central processing unit that executes various programs and controls various sections. Namely, the CPU 20A reads a program from the ROM 20B and executes the program using the RAM 20C as a workspace. The CPU 20A is an example of a processor.

The ROM 20B stores various programs and various data. An authentication program 100 and identification (ID) information 110 are stored in the ROM 20B of the present exemplary embodiment.

The authentication program 100 is a program for controlling the ECU 20. Unique ID information for the vehicle 12 is stored as the ID information 110.

The RAM 20C acts as a workspace that temporarily stores programs or data.

The input/output I/F 20D is an interface for communicating with the LF transmitters 22, the UHF receiver 24, the UWB communication section 26 and the respective door locking devices 28.

Note that the ECU 20 may include storage serving as a storage section instead of the ROM 20B, or in addition to the ROM 20B. Such storage may be configured by a hard disk drive (HDD) or a solid state drive (SSD).

Figure 3:
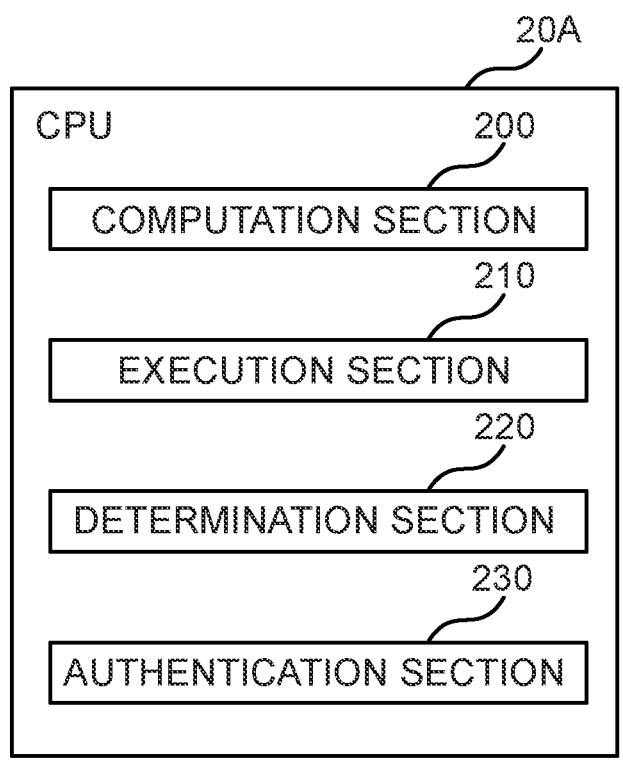
FIG. 3 is a block diagram illustrating functional configuration of a CPU of an ECU of an exemplary embodiment.

As illustrated in FIG. 3, by executing the authentication program 100, the CPU 20A of the ECU 20 of the present exemplary embodiment functions as a computation section 200, an execution section 210, a determination section 220, and an authentication section 230.

The computation section 200 includes a function to compute a distance and an angle of a position of the electronic key 14 with respect to the distance measurement unit 25 based on ultra-wideband (UWB) wireless communication between the UWB communication section 26 and the electronic key 14.

The execution section 210 includes a function to cause the LF transmitter 22 that, out of the plural LF transmitters 22, corresponds to the angle computed by the computation section 200 to execute LF band wireless communication with the electronic key 14.

The determination section 220 includes a function to determine whether or not the electronic key 14 is present in an area corresponding to the LF transmitter 22 that executed the wireless communication, based on the executed LF band wireless communication and the computed distance. The determination section 220 of the present exemplary embodiment sets a determination distance as a threshold, based on the angle computed by the computation section 200. In a case in which wireless communication with the electronic key 14 has been established by the corresponding LF transmitter 22, and the distance computed by the computation section 200 is no greater than the determination distance, the determination section 220 determines that the electronic key 14 is present in the corresponding area.

The authentication section 230 includes a function to authenticate that the electronic key 14 is a terminal corresponding to the vehicle 12. The authentication section 230 of the present exemplary embodiment authenticates the electronic key 14 in cases in which an ID stored in ID information 150 of the electronic key 14 matches an ID stored in the ID information 110 of the ECU 20.

As illustrated in FIG. 2, the electronic key 14 is an electronic device that can be carried by a user of the vehicle 12. The electronic key 14 includes a microcomputer 40, the LF receiver 42, the UHF transmitter 44, and the UWB communication section 46. The microcomputer 40 is configured including at least non-volatile memory 40B. The ID information 150 serving as unique information for the electronic key 14 is stored in the memory 40B.

The LF receiver 42 is a communication unit that performs LF band wireless communication, and receives request signals from the LF transmitters 22. The UHF transmitter 44 is a transmission unit that performs UHF band wireless communication, and transmits a response signal to the UHF receiver 24.

The UWB communication section 46 is a communication unit that performs ultra-wideband (UWB) wireless communication, and communicates with the UWB communication section 26.

Control Flow

Figure 4:
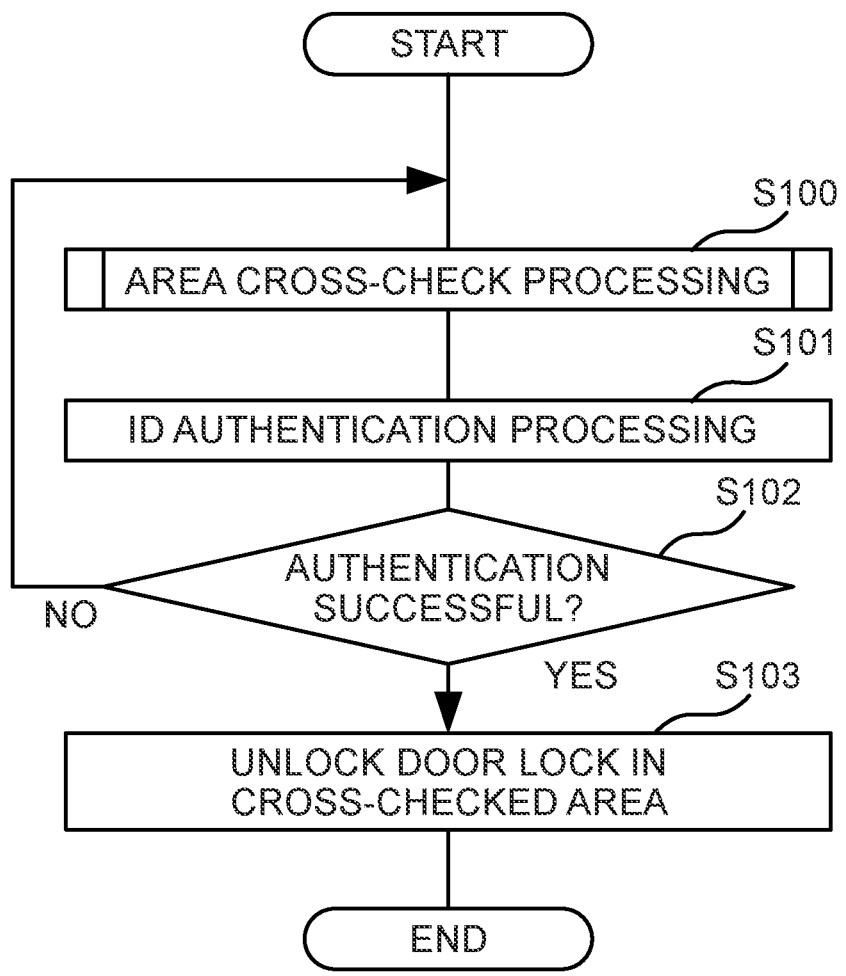
FIG. 4 is a flowchart illustrating a flow of unlocking processing of an exemplary embodiment.
Figure 5:
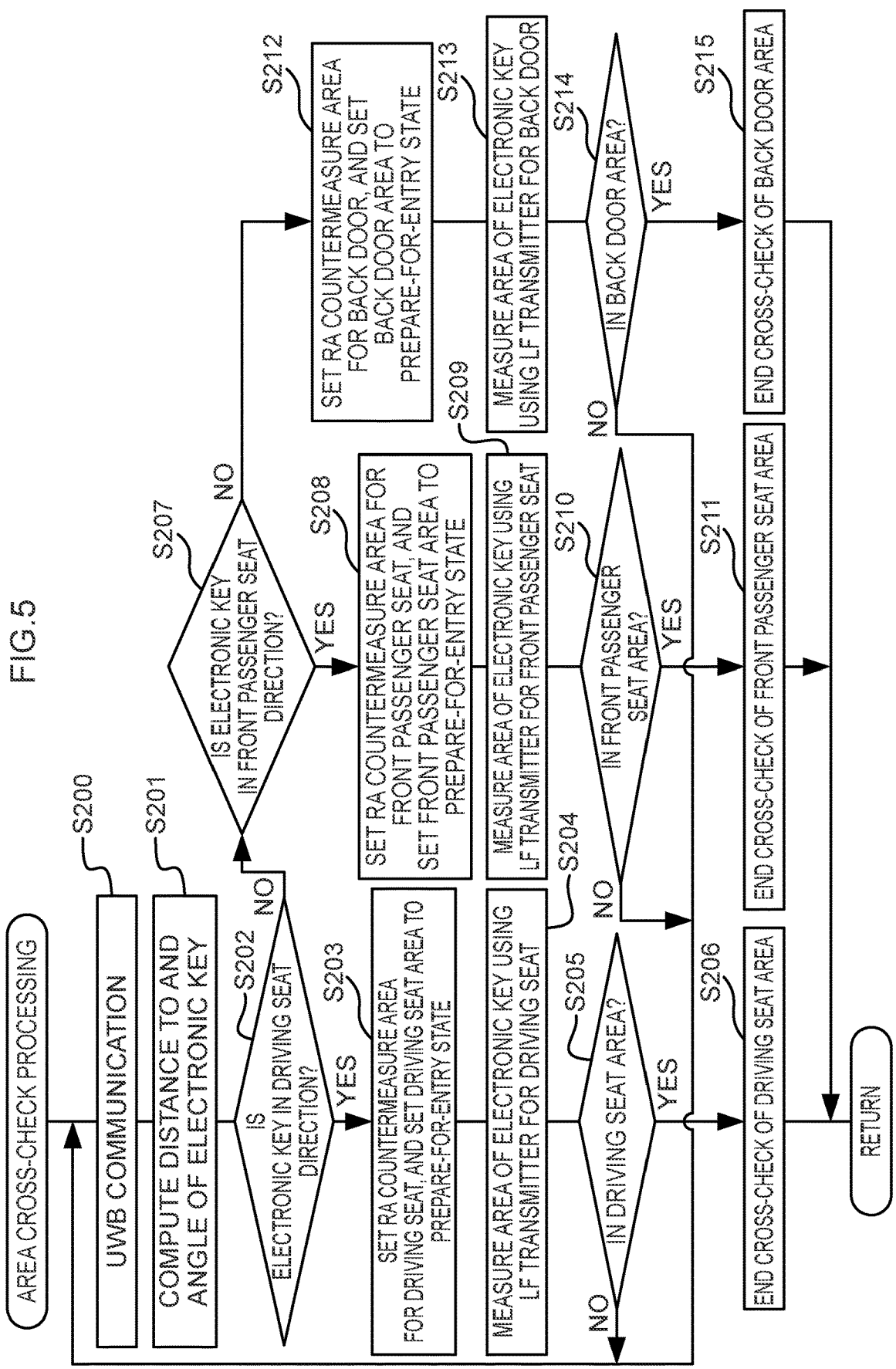
FIG. 5 is a flowchart illustrating a flow of area cross-check processing in an exemplary embodiment.

Explanation follows regarding a flow of processing executed by the ECU 20 of the present exemplary embodiment, with reference to the flowcharts in FIG. 4 and FIG. 5. The processing by the ECU 20 is implemented by the CPU 20A functioning as the computation section 200, the execution section 210, the determination section 220, and the authentication section 230 described previously.

First, explanation follows regarding unlocking processing, with reference to FIG. 4. At step S100 in FIG. 4, the CPU 20A executes area cross-check processing. This area cross-check processing is described in detail later.

At step S101, the CPU 20A executes ID authentication processing. Note that during the area cross-check processing, a request signal is transmitted from the onboard equipment 11 to the electronic key 14, and the electronic key 14 transmits a response signal to the onboard equipment 11 in response to the received request signal. During the ID authentication processing, the CPU 20A performs authentication by checking for a match between the ID included in the response signal and the ID on the onboard equipment 11 side.

At step S102, the CPU 20A determines whether or not authentication has been successful, namely whether or not the authentication of step S101 found a match between the ID included in the response signal and the ID on the onboard equipment 11 side. In cases in which the CPU 20A determines that authentication has been successful (in cases in which step S102: YES), processing proceeds to step S103. On the other hand, in cases in which the CPU 20A determines that authentication has been unsuccessful (in cases in which step S102: NO), processing returns to step S100.

At step S103, the CPU 20A unlocks the door lock for the area for which the cross-check was performed during the area cross-check processing. The unlocking processing then ends.

Figure 6:
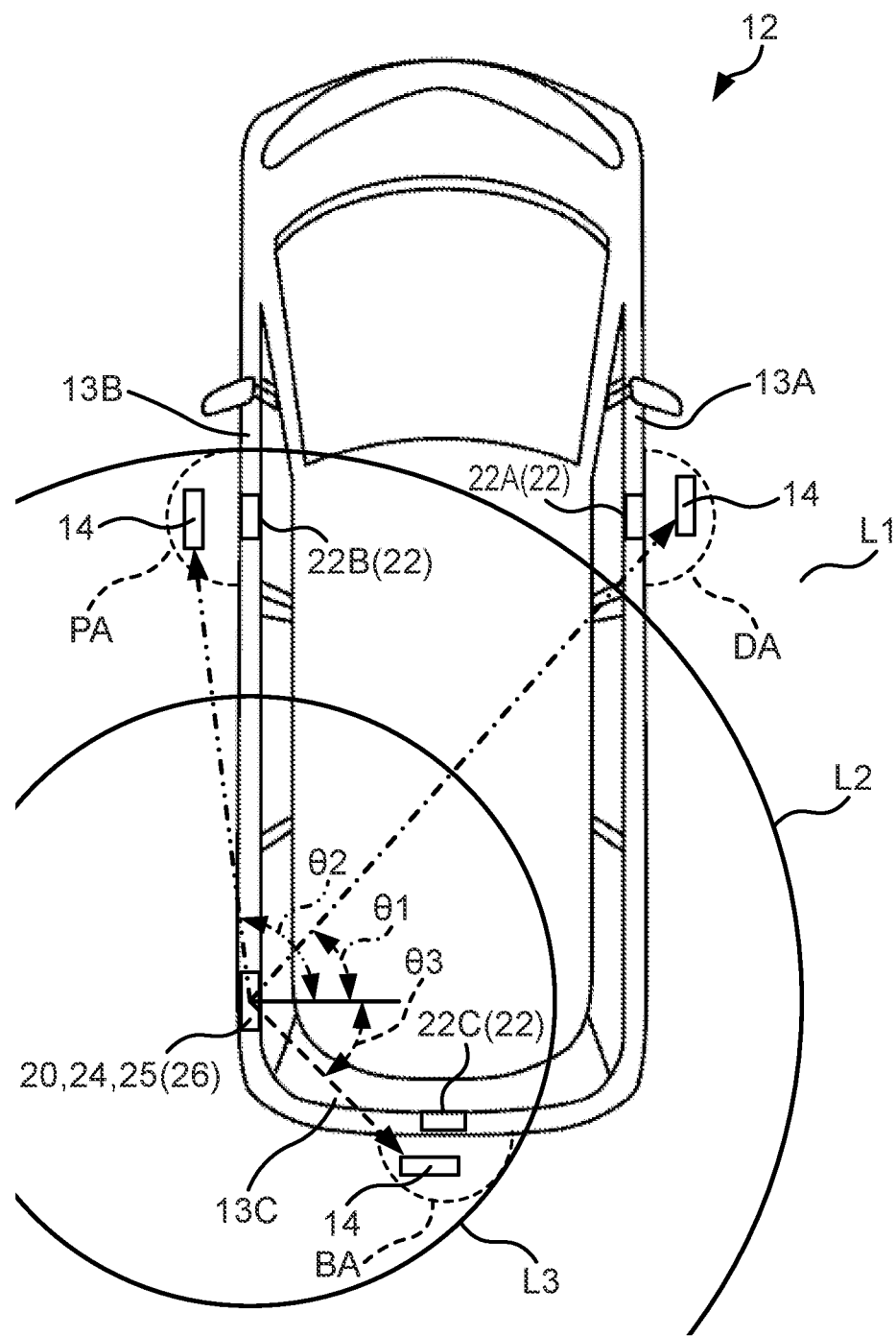
FIG. 6 is a diagram illustrating operation of an exemplary embodiment.

Next, detailed explanation follows regarding the area cross-check processing in FIG. 5, with reference to the example in FIG. 6.

At step S200 in FIG. 5, the CPU 20A communicates with the electronic key 14 using UWB wireless communication. The UWB communication section 26 receives radio waves from the electronic key 14 by UWB wireless communication.

At step S201, the CPU 20A computes the distance from the distance measurement unit 25 to the electronic key 14, and the angle of the electronic key 14 with respect to the distance measurement unit 25.

At step S202, the CPU 20A determines whether or not the electronic key 14 is located in a driving seat direction, namely at an angle θ1 (see FIG. 6) defined as the direction of the driving seat door 13A. In cases in which the CPU 20A determines that the electronic key 14 is located in the driving seat direction (in cases in which step S202: YES), processing proceeds to step S203. On the other hand, in cases in which the CPU 20A determines that the electronic key 14 is not located in the driving seat direction (in cases in which step S202: NO), processing proceeds to step S207.

At step S203, the CPU 20A sets a RA countermeasure area for the driving seat in order to counter relay attacks, and sets a driving seat area DA to a prepare-for-entry state. Specifically, as illustrated in FIG. 6, the CPU 20A sets the determination distance to a distance L1 including the driving seat area DA, and activates the LF transmitter 22A.

At step S204 in FIG. 5, the CPU 20A uses the LF transmitter 22A for the driving seat to measure an area in which the electronic key 14 is present. Specifically, the CPU 20A transmits LF band radio waves from the LF transmitter 22A to the electronic key 14, and acquires a reception strength from the electronic key 14 that has received these radio waves through the UHF receiver 24. The CPU 20A then determines whether or not the electronic key 14 is present within the driving seat area DA based on this reception strength.

At step S205, the CPU 20A determines whether or not the electronic key 14 is present within the driving seat area DA. In cases in which the CPU 20A determines that the electronic key 14 is present in the driving seat area DA (in cases in which step S205: YES), processing proceeds to step S206. On the other hand, in cases in which the CPU 20A determines that the electronic key 14 is not present in the driving seat area DA (in cases in which step S205: NO), processing returns to step S200.

At step S206, the CPU 20A ends the driving seat area DA cross-check. The CPU 20A then ends the area cross-check processing and returns to the unlocking processing.

At step S207, the CPU 20A determines whether or not the electronic key 14 is located in a front passenger seat direction, namely at an angle θ2 (see FIG. 6) defined as the direction of the front passenger seat door 13B. In cases in which the CPU 20A determines that the electronic key 14 is located in the front passenger seat direction (in cases in which step S207: YES), processing proceeds to step S208. On the other hand, in cases in which the CPU 20A determines that the electronic key 14 is not located in the front passenger seat direction (in cases in which step S207: NO), processing proceeds to step S212.

At step S208, the CPU 20A sets a RA countermeasure area for the front passenger seat in order to counter relay attacks, and sets a front passenger seat area PA to a prepare-for-entry state. Specifically, as illustrated in FIG. 6, the CPU 20A sets the determination distance to a distance L2 including the front passenger seat area PA, and activates the LF transmitter 22B.

At step S209 in FIG. 5, the CPU 20A uses the LF transmitter 22B for the front passenger seat to measure an area in which the electronic key 14 is present. Specifically, the CPU 20A transmits LF band radio waves from the LF transmitter 22B to the electronic key 14, and acquires a reception strength from the electronic key 14 that has received these radio waves through the UHF receiver 24. The CPU 20A then determines whether or not the electronic key 14 is present within the front passenger seat area PA based on this reception strength.

At step S210, the CPU 20A determines whether or not the electronic key 14 is present within the front passenger seat area PA. In cases in which the CPU 20A determines that the electronic key 14 is present in the front passenger seat area PA (in cases in which step S210: YES), processing proceeds to step S211. On the other hand, in cases in which the CPU 20A determines that the electronic key 14 is not present in the front passenger seat area PA (in cases in which step S210: NO), processing returns to step S200.

At step S211, the CPU 20A ends the front passenger seat area PA cross-check. The CPU 20A then ends the area cross-check processing and returns to the unlocking processing.

At step S212, the CPU 20A sets a RA countermeasure area for the back door in order to counter relay attacks, and sets a back door area BA to a prepare-for-entry state. Specifically, as illustrated in FIG. 6, the CPU 20A sets the determination distance to a distance L3 including the back door area BA, and activates the LF transmitter 22C.

Note that although a RA countermeasure area is set for the back door and the back door area BA is set to the prepare-for-entry state in cases in which the electronic key 14 is neither in the driving seat direction nor in the front passenger seat direction in the present exemplary embodiment, there is no limitation thereto. For example, the CPU 20A may execute the processing of step S212 in cases in which the electronic key 14 is at an angle θ3 defined as the direction of the back door 13C.

At step S213 in FIG. 5, the CPU 20A uses the LF transmitter 22C for the back door to measure an area in which the electronic key 14 is present. Specifically, the CPU 20A transmits LF band radio waves from the LF transmitter 22C to the electronic key 14, and acquires a reception strength from the electronic key 14 that has received these radio waves through the UHF receiver 24. The CPU 20A then determines whether or not the electronic key 14 is present within the back door area BA based on this reception strength.

At step S214, the CPU 20A determines whether or not the electronic key 14 is present within the back door area BA. In cases in which the CPU 20A determines that the electronic key 14 is present in the back door area BA (in cases in which step S214: YES), processing proceeds to step S215. On the other hand, in cases in which the CPU 20A determines that the electronic key 14 is not present in the back door area BA (in cases in which step S214: NO), processing returns to step S200.

At step S215, the CPU 20A ends the back door area BA cross-check. The CPU 20A then ends the area cross-check processing and returns to the unlocking processing.

Summary of Exemplary Embodiment

In the ECU 20 of the present exemplary embodiment, the computation section 200 computes the distance and the angle of the position of the electronic key 14 with respect to the distance measurement unit 25 based on UWB wireless communication with the electronic key 14. The execution section 210 then causes the LF transmitter 22 corresponding to the angle computed by the execution section 210 to execute LF band wireless communication with the electronic key 14. The determination section 220 determines whether or not the electronic key 14 is present within the area corresponding to the executed LF transmitter 22 based on the executed LF band wireless communication and the computed distance. The areas corresponding to the LF transmitters 22 include the driving seat area DA, the front passenger seat area PA, and the back door area BA.

In the present exemplary embodiment configured as described above, one LF transmitter 22 from out of the plural LF transmitters 22 is caused to execute wireless communication based on the angle of the electronic key 14. This enables power consumption during communication with the electronic key 14 to be suppressed. Moreover, specifying a particular LF transmitter 22 for actuation enables the responsiveness of the entire system to be improved. Furthermore, unlocking is enabled only in cases in which the electronic key 14 is present in an area corresponding to a particular LF transmitter 22, thereby suppressing relay attacks that make use of a relay device.

Moreover, in the present exemplary embodiment, the determination distance that the determination section 220 employs to make a determination is dynamically changed based on the computed angle of the electronic key 14, thereby enabling security against relay attacks to be ensured. In particular, the present exemplary embodiment enables a determination distance to be set for each door of the vehicle 12 that may be unlocked, thereby enabling measures against relay attacks to be realized individually for each door.

In related technology in which the distance of an UWB electronic key is measured in order to implement measures against relay attacks, installing a UWB antenna module at the center of the vehicle would in theory enable a secure area to be set over a range reaching a uniform distance from the vehicle. However, various constraints make it difficult to install an antenna module at the center of an actual vehicle, and, for example, installing separate antenna modules at both the front and rear of the vehicle in order to set a secure area over a range reaching a uniform distance from the vehicle would lead to an increase in cost. By contrast, in the vehicle 12 of the present exemplary embodiment the distance measurement unit 25 used for distance measurement does not necessarily need to be installed at the center of the vehicle 12, thereby enabling a greater degree of freedom to be secured with respect to installation of the distance measurement unit 25. In the present exemplary embodiment, the distance measurement unit 25 is installed to a rear pillar of the vehicle. However, there is no limitation thereto as long as the location is one where radio waves have a clear line of sight, and the distance measurement unit 25 may for example be installed in the vicinity of a front window, the vicinity of a rear window, or on the roof. This enables an increase in installation costs of the distance measurement unit 25 to be suppressed.

Remarks

In the present exemplary embodiment, the UWB communication section 26 is installed in order to obtain the distance and angle of the electronic key 14, and the UHF receiver 24 is installed in order to receive a response signal. However, if a Bluetooth (registered trademark) communication device is employed, the UWB communication section 26 and the UHF receiver 24 of the onboard equipment 11 may be integrated into a single unit. Similarly, the UWB communication section 46 and the UHF transmitter 44 of the electronic key 14 may also be integrated into a single unit.

Note that the various processing executed by the CPU 20A reading and executing software (a program) in the above exemplary embodiment may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The various processing described above may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, in the exemplary embodiment described above, explanation has been given regarding a case in which the respective programs are stored in advance (installed) on a computer-readable non-transitory storage medium. For example, the authentication program 100 for the ECU 20 is stored in advance in the ROM 20B. However, there is no limitation thereto, and the programs may be provided in a format stored on a non-transitory storage medium such as a compact disc read only memory (CD-ROM), digital versatile disc read only memory (DVD-ROM), or universal serial bus (USB) memory. Alternatively, the programs may be downloadable from an external device over a network.

The processing flows described above in the above exemplary embodiment are merely examples, and unnecessary steps may be removed, additional steps may be provided, and the processing sequence may be changed within a range not departing from the spirit thereof

What is claimed is:

1. An authentication device comprising:
a processor;
a first communication section installed at a vehicle and configured to perform first wireless communication with a terminal; and
a plurality of second communication sections installed at the vehicle and configured to perform second wireless communication with the terminal,
the processor being configured to:
compute a distance and an angle of a position of the terminal with respect to the first communication section based on the first wireless communication of the first communication section with the terminal;
cause a second communication section that, out of the plurality of second communication sections, corresponds to the computed angle, to execute the second wireless communication with the terminal;
determine, based on the executed second wireless communication and the computed distance, whether or not the terminal is present in an area corresponding to the second communication section executing the second wireless communication;
set a determination distance as a threshold based on the computed angle; and
determine that the terminal is present in the area in a case in which communication with the terminal is established by the second wireless communication and the computed distance is no greater than the determination distance.

2. The authentication device of claim 1, wherein:
the second communication sections are provided at respective locations corresponding to a driving seat door, a front passenger seat door, and a back door of the vehicle; and
the processor is configured to cause a second communication section located at the computed angle to execute the second wireless communication.

3. The authentication device of claim 2, wherein in a case in which the computed angle does not correspond to either the driving seat door or the front passenger seat door, the processor causes a second communication section corresponding to the back door to execute the second wireless communication.

4. The authentication device of claim 1, wherein the processor is further configured to unlock a door in an area in which the terminal has been determined to be present in a case in which the terminal has been authenticated as corresponding to the vehicle.

5. A vehicle comprising:
the authentication device of claim 1; and
a driving seat door, a front passenger seat door, and a back door configured to be locked and unlocked by the authentication device.

6. The vehicle of claim 5, wherein the first communication section is installed at the vehicle at a location where radio waves have a clear line of sight.

7. An authentication method in which a computer executes processing of an authentication device including a first communication section that is installed at a vehicle and that performs first wireless communication with a terminal, and a second communication section that performs second wireless communication with the terminal, the processing comprising:
computing a distance and an angle of a position of the terminal with respect to the first communication section based on the first wireless communication of the first communication section with the terminal;
executing the second wireless communication with the terminal using the second communication section that, out of a plurality of the second communication sections, corresponds to the computed angle;
determining, based on the executed second wireless communication and the computed distance, whether or not the terminal is present in an area corresponding to the second communication section executing the second wireless communication;
setting a determination distance as a threshold based on the computed angle; and
determining that the terminal is present in the area in a case in which communication with the terminal is established by the second wireless communication and the computed distance is no greater than the determination distance.

8. A non-transitory storage medium storing an authentication program for executing processing of an authentication device including a first communication section that is installed at a vehicle and that performs first wireless communication with a terminal, and a second communication section that performs second wireless communication with the terminal, the authentication program causing a computer to execute processing comprising:
computing a distance and an angle of a position of the terminal with respect to the first communication section based on the first wireless communication of the first communication section with the terminal;
executing the second wireless communication with the terminal using the second communication section that, out of a plurality of the second communication sections, corresponds to the computed angle;
determining, based on the executed second wireless communication and the computed distance, whether or not the terminal is present in an area corresponding to the second communication section executing the second wireless communication;
setting a determination distance as a threshold based on the computed angle; and
determining that the terminal is present in the area in a case in which communication with the terminal is established by the second wireless communication and the computed distance is no greater than the determination distance.

* * * * *